United States Patent [19]

Cheney, Jr.

[11] 4,332,525
[45] Jun. 1, 1982

[54] MATCHED STIFFNESS ROTOR FLEXBEAM AND BLADE SYSTEM

[75] Inventor: Marvin C. Cheney, Jr., Glastonbury, Conn.

[73] Assignee: United Technologies Corporation, Hartford, Conn.

[21] Appl. No.: 99,820

[22] Filed: Dec. 3, 1979

[51] Int. Cl.³ .............................................. B64C 27/38
[52] U.S. Cl. ............................. 416/134 A; 416/141; 416/226
[58] Field of Search .............. 416/134 A, 141, 138 A, 416/226, 231 A

[56] References Cited

U.S. PATENT DOCUMENTS

| | | | |
|---|---|---|---|
| 3,261,407 | 7/1966 | Culver et al. | 170/160.25 |
| 3,874,820 | 4/1975 | Fenaughty | 416/226 |
| 3,880,551 | 4/1975 | Kisovec | 416/134 A |
| 3,999,886 | 12/1976 | Ormiston et al. | 416/138 A |
| 4,087,203 | 5/1978 | Ferris | 416/134 A X |
| 4,093,400 | 6/1978 | Rybicki | 416/141 |
| 4,244,677 | 1/1981 | Noehren et al. | 416/141 |

FOREIGN PATENT DOCUMENTS 951301  7/1974  Canada ............................. 416/226

OTHER PUBLICATIONS

*American Helicopter Society*, "Ground and Air Resonance Characteristics of a Soft In-Plane Rigid-Rotor System", R. E. Donham et al., pp. 33–41, Feb. 1969.
*American Helicopter Society Publication*, "Results of Preliminary Studies of a Bearingless Helicopter Rotor Concept", by M. C. Cheney, May 1972.

*Primary Examiner*—Everette A. Powell, Jr.
*Attorney, Agent, or Firm*—Harry J. Gwinnell

[57] ABSTRACT

A flexbeam having matched in-plane and out-of-plane stiffness is described extending at least partway between the tips of a pair of rotor blades bonded thereto. The flexbeam so constituted produces a blade system with a primary in-plane frequency less than the primary forcing frequency. The matched stiffness of the flexbeam is provided by admixing, either compositionally or by laminating, materials of differing flexibilities to produce a high damping material of symmetrical stiffness.

12 Claims, 19 Drawing Figures

MATCHED STIFFNESS ROTOR FLEXBEAM AND BLADE SYSTEM

CROSS REFERENCE TO RELATED APPLICATION

Attention is directed to U.S. application Ser. No. 99,767 of common assignee, filed Dec. 3, 1979, which discloses compositions usable in the present invention.

BACKGROUND OF THE INVENTION

1. Field of the Invention

The field of art to which this invention pertains is fluid reaction surfaces having resiliently mounted non-rigid working members.

2. Description of the Prior Art

Conventional rotor systems may best be characterized by their relative complexity. The development of fully articulated rotor systems such as helicopter rotor systems has generally taken directions dictated by structural and dynamic stability requirements and the satisfaction of these requirements has resulted in rotor systems which are intricate and possess compromised weight, cost and maintenance factors. While some reduction in complexity has been achieved with nonarticulated or hingeless rotors (note, for example, U.S. Pat. No. 3,484,174), existing designs still experience relatively high blade loads and utilize such things as feathering bearings and mechanical edgewise dampers to provide pitch control and avoid destructive resonances. However, further significant reductions in weight and maintenance requirements are still possible.

Early designs (e.g., Canadian Pat. No. 951,301) of bearingless rotor systems included a "stiff" design where the edgewise or in-plane natural frequency was between one and two times the primary forcing frequency (rotor rotational frequency equal 1P). By selecting an in-plane frequency above 1P, this completely eliminated any possibility of frequency coalescence during rotor run up. And while hinged rotors are generally designed to have such frequencies at values below 1P, it is at a significant cost of added weight and complexity through mechanical edgewise dampers installed around the hinges.

Further, although an important advantage of the hingeless rotor over the articulated rotor is the potential for improved handling qualities due to high control power and damping, additional reductions in weight, drag, loads, and complexity are needed for improved performance and reduced operating costs.

BRIEF SUMMARY OF THE INVENTION

The present invention is directed to a flexbeam-containing bearingless rotor blade system, where the flexbeam has a matched in-plane and out-of-plane stiffness producing a blade system with a primary in-plane frequency less than the primary rotor frequency. The matched stiffness of the flexbeam is produced by admixing, either compositionally or by lamination, materials of differing flexibilities to produce a high damping material of symmetrical stiffness. The resulting system has a reduced amplitude of response over conventional systems, essentially eliminates control system feedback, significantly reduces blade loads, and has a reduced weight as compared to comparable stability in conventional systems.

The foregoing and other objects, features and advantages of the present invention will become more apparent from the following description of preferred embodiments and accompanying drawings.

DETAILED DESCRIPTION OF THE PREFERRED EMBODIMENT

The present invention accomplishes the retention of the high control power available in existing bearingless designs (e.g., Canadian patent supra) while offering the potential for significant reductions in weight, loads, and complexity to the elimination of blade pitch bearings and damping without heavy, draggy and unreliable external dampers. The unique utilization of the non-isotropic properties of the advanced reinforced composite materials makes the accomplishment of such results possible. Specifically, the use of large variations in bending to shear modulus ratios may be obtained through the selection of the particular materials of the composite flexbeam. The resulting assembly, a lightweight, simple blade mounting structure is both stiff enough in bending to satisfy control power and dynamic stability requirements and flexible enough in torsion to permit control of the blade pitch angles through the twisting of the flexbeam, yet with improved damping over currently existing hingeless assemblies. The rotor system utilizes a torsionally flexible composite flexbeam of substantially square cross section in combination with a torsionally rigid blade shell having only an outboard portion attached to the flexbeam. In the preferred embodiment, the flexbeam is comprised of an admixture of flexible epoxy, stiff epoxy, and flexible curing agent (e.g., as described in copending U.S. Ser. No. 99,767, filed Dec. 3, 1979, the disclosure of which is incorporated by reference). The composite flexbeam material includes a plurality of layers of high modulus of elasticity filaments such as glass or graphite fibers which can be bonded together in uniaxial side-by-side relationship substantially parallel to the longitudinal axis of the flexbeam and the blade shell can comprise such filaments bonded together in a cross-ply relationship with similar plastic material. With this configuration the flatwise bending stiffness of the flexbeam (stiffness in a direction normal to the plane of rotation) permits a rotor system stiffness significantly greater than that normally encountered with conventional articulated rotors or on other rotor systems. Since high rotor stiffness is indicative of high rotor control power and damping, this invention offers the potential for better aircraft handling qualities than do the aforementioned alternate rotor systems.

The composite preferably comprises a resin matrix containing about 20% to about 43% by weight of a flexible epoxy, about 12% to about 35% by weight of a stiff epoxy, about 35% to about 61% by weight of a flexible curing agent and about 20% to about 50% by weight of a high modulus fiber based on the weight of a fiber plus resin. Best results are obtained when the stiff epoxy is an epichlorohydrin-bisphenol-A-diglycidal ether epoxy present in an amount about 24% by weight, the flexible epoxy is a linoleic dimer acid glycidal ester epoxy present in an amount about 27% by weight, the flexible cross-linking agent is a long chain amine-fatty acid amide present in an amount about 49% by weight, and the high modulus fiber is graphite present in an amount about 42% by weight. Preferred flexbeam properties are flexural strength greater than $5 \times 10^3$ psi and preferably $15.6 \times 10^3$ psi, flexural modulus greater than $10 \times 10^6$ psi and preferably $14.3 \times 10^6$ psi, damping up to about 6% critical and preferably about 2.64% critical, torsional shear modulus less than about $3 \times 10^5$ and preferably about $3.88 \times 10^4$, and stress at elastic limit greater than 60 psi and preferably about 95 psi.

As stated above, the flexbeam is preferably a composite of materials (either in admixture or lamination) which provides matched in-plane and out-of-plane stiffness in the flexbeam. Specifically, the combination is designed to produce damping of greater than 3% critical (note FIG. 12). Preferably, the flexbeam is molded with fiber reinforcement and the above-cited epoxy mixture into square cross-section (FIG. 11c) for ease of fabrication. A laminate of fiber-silicone resin composite on a graphite fiber-epoxy core in rectangular form (see FIG. 11a) can also be used. The bearingless blade system of the present invention produces a primary in-plane frequency below 1P (rotor rotational frequency). This is accomplished in the present invention through the use of the composite flexbeam described above providing the requisite damping. By matching the in-plane and out-of-plane stiffnesses to be roughly equal (within about 5%), (1) the amplitude of response is reduced; (2) control system feedback is essentially eliminated; (3) blade loads are significantly reduced; and (4) blade weight with the degree of damping produced in the system according to the present invention is reduced.

Figure 8:
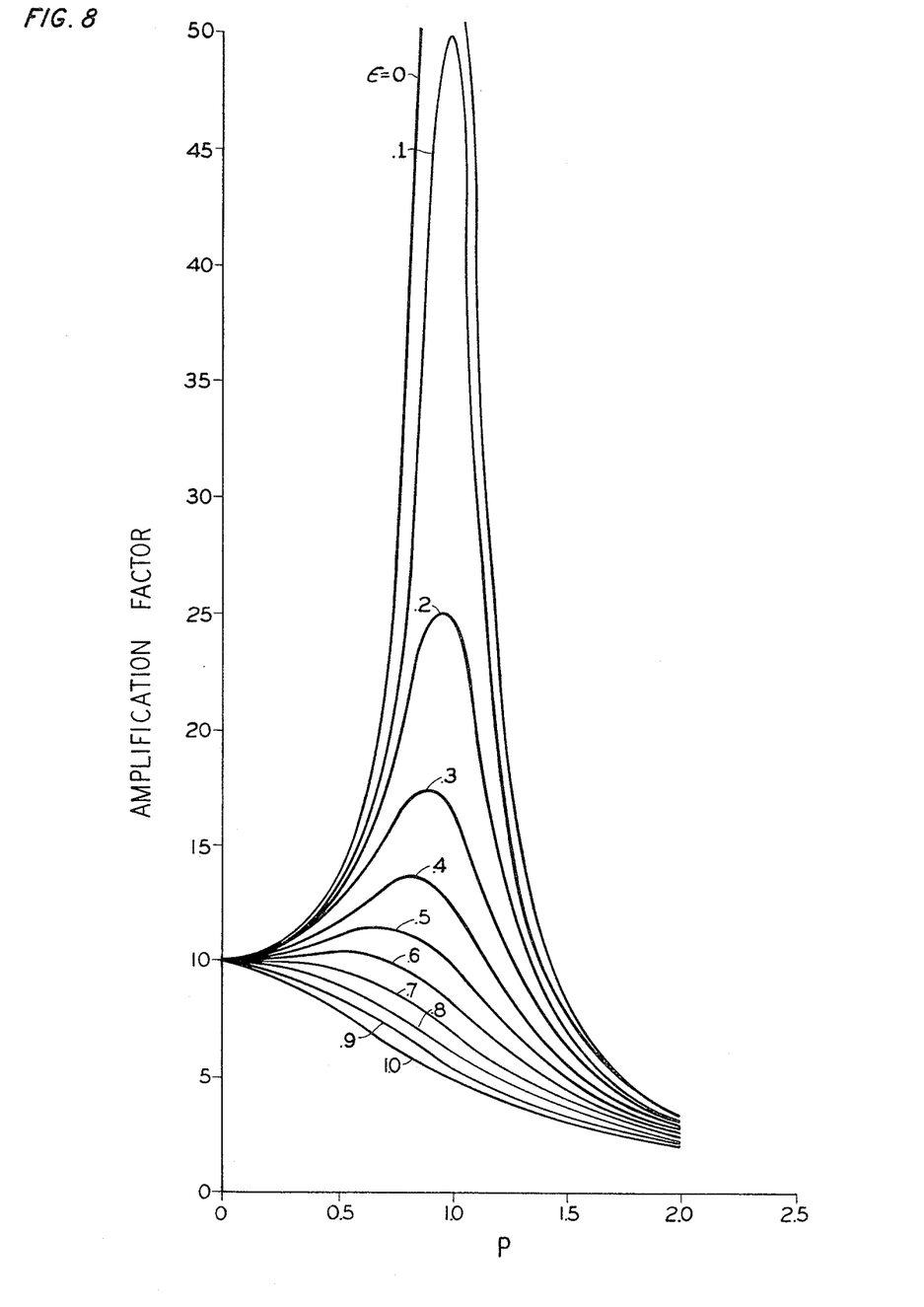
FIG. 8 describes sample edgewise responses in various bearingless blade designs.

An an example of (1) above, attention is directed to FIG. 8. This figure demonstrates the amplitude of response of blades in terms of multiples of P, or rotor rotational frequency values. The numbered curves (0 to 1.0) represent the damping factors. For a typical stiff in-plane system where the in-plane natural frequency is, for example, one and a half times the rotational frequency (P=1/1.5=0.67) the amplification factor is about two, assuming a damping of zero. However, in a similar system utilizing a matched stiffness flexbeam resulting in an in-plane natural frequency of, for example, 0.6 times the rotor frequency (P=1/0.6=1.67), the amplification is only about 0.57, representing a 70% reduction.

As regards (2) above, control system feedback is eliminated since coupled flatwise-edgewise blade deflections do not translate into torsional deflections with a matched stiffness or symmetrical cross section. This eliminates undesirable control feedback loads which have been demonstrated to have significant impact on control design and handling qualities of current helicopters, for example. It is therefore clear that such a matched stiffness design would greatly reduce control system complexity and weight.

Figure 13:
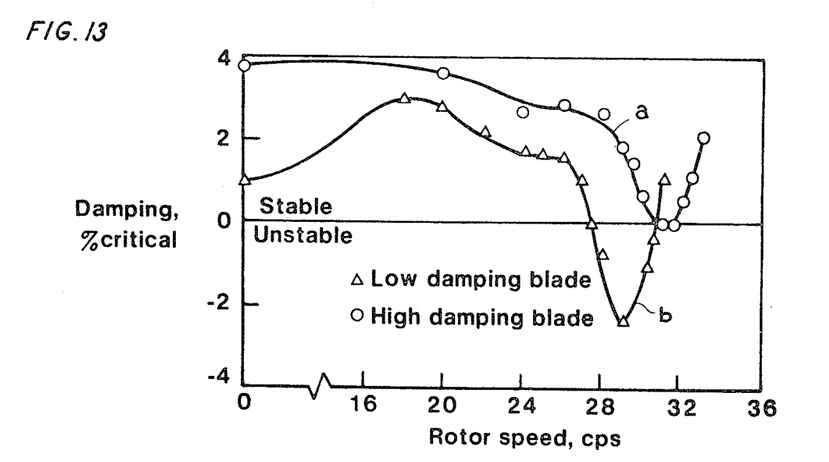
FIG. 13 compares the system stability of a helicopter wind tunnel model using a high damping rotor according to the present invention with that of a conventional or low damping rotor.
Figure 14:
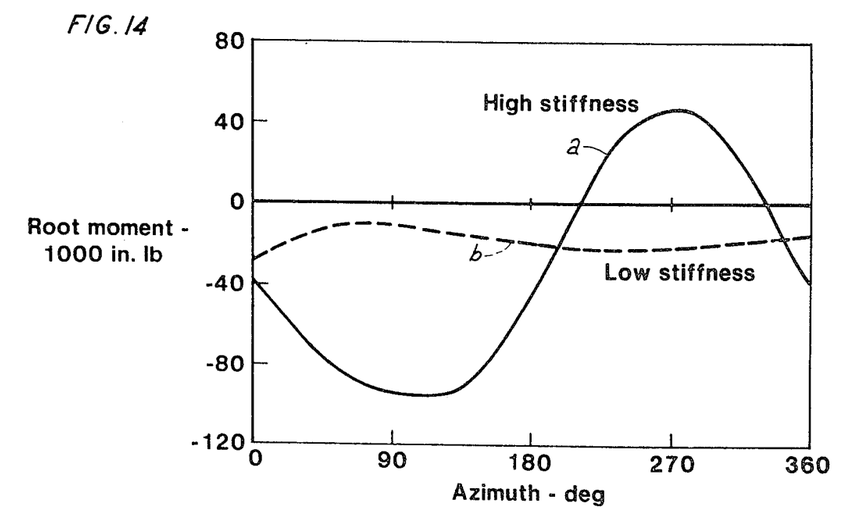
FIG. 14 demonstrates the reduction in vibratory blade moment of a low stiffness blade according to the present invention compared to a conventional or high stiffness rotor.

As regards (3) above, a reduction in blade loads is achieved through the reduction in blade response described in (1) above. Attention is directed to FIG. 14 where the blade vibratory moment of the present low stiffness design (A) is shown to be greatly reduced over that of the conventional design (B). In this test, based on analytical calculations, a flight speed of 170 knots was used, based on a rotor diameter of 62 feet, and a blade tip speed of 650 feet per second. The X axis indicates the root moment at the blade in terms of thousands of inch pounds and the Y axis indicates the position of the blade on the azimuth in degrees. The results are verified by FIG. 13.

Figure 9:
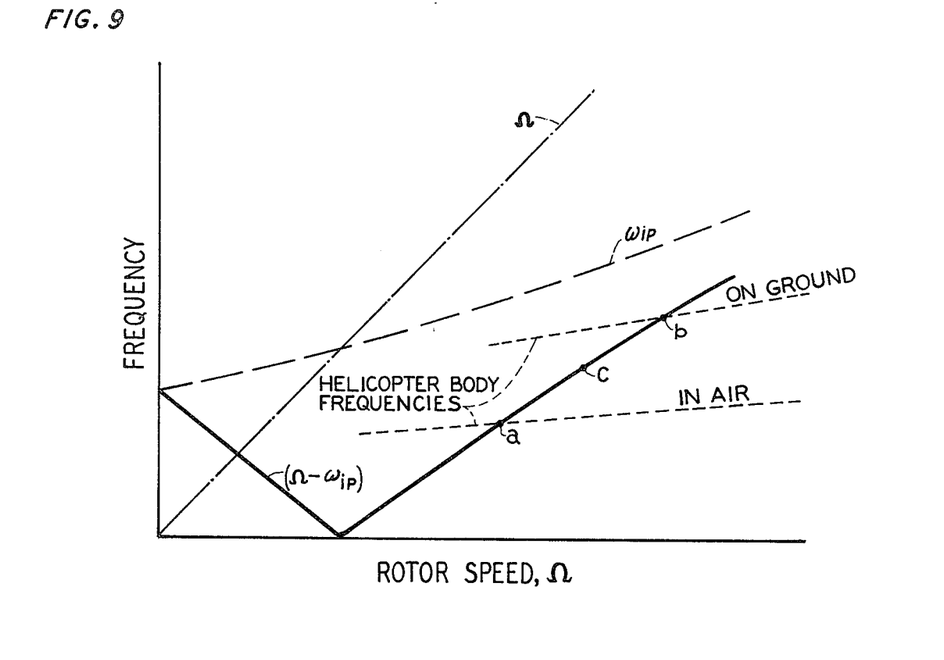
FIG. 9 demonstrates driving frequency as a result of rotor speed in blades made according to the present invention.

As regards (4) above, a reduction in blade weight might be expected with a matched stiffness design since structure normally required to provide high edgewise stiffness would be eliminated. The major drawback in matched design systems of the past, however, is the rotor speed restrictions imposed on such systems. It has been found that low edgewise stiffness rotors attempted in the past (for example the mechanical systems mentioned above such as the hingeless but not bearingless type) have limited operating ranges due to the ground or air resonance stability problems. An example of this is indicated in FIG. 9 as discussed above where the driving frequency (rotor speed) intersects with body frequencies when operating both in air and on the ground. Normally, the required rotor speed falls between these two boundaries; however, small excursions from this normal RPM produce serious stability problems. As a result, such existing matched designs have not proven successful.

Attempts to eliminate this problem have included adequate damping to dissipate energy. However, with hinged rotors these mechanical dampers are heavy, draggy, unreliable, and add significantly to the complexity of the system. And with a hingeless rotor system, a mechanical damper would be even more complex. There is no specific hinge point around which a damper can be installed. Thus, an unwieldy installation would be required to extend outboard to a point on the blade where adequate in-plane motion is present. This would be extremely more complex than even with a hinged rotor system.

Figure 1:
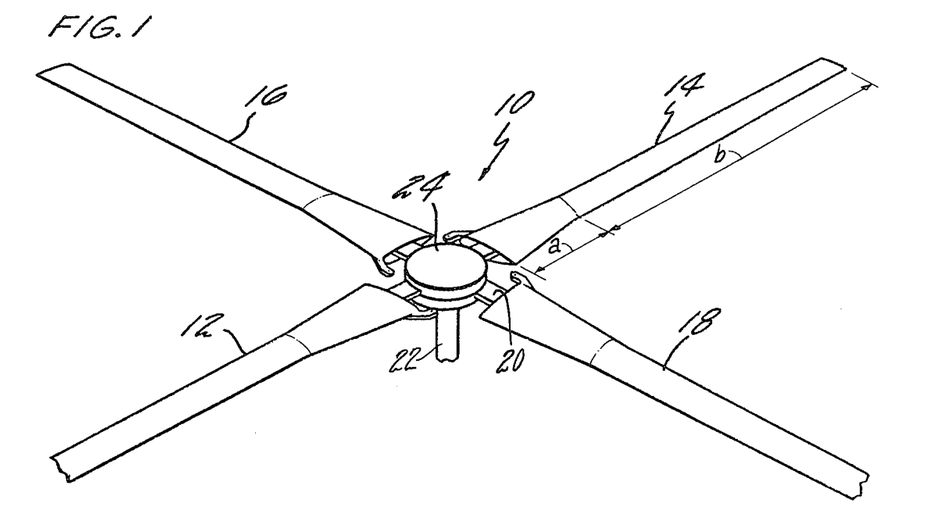
FIG. 1 is a perspective view of a helicopter rotor and blade assembly.

Referring now more specifically to the drawings, the numeral 10 in FIG. 1 generally refers to the rotary wing system, as a whole, of the present invention. As shown, all hinges and bearings have been eliminated. The system includes two diametrically opposed blade pairs, one comprising blades 12 and 14 and the other blades 16 and 18. The blade pairs are each mounted on either a continuous one-piece flexbeam and spar 20 which extends continuously between the tips of the blades or a composite flexbeam portion a and spar portion b. The flexbeam-spar can be one continuous piece extending the full length inboard and outboard between the blade tips or a composite where the flexbeam constitutes the inboard portion only, traversing the hub section, and a separate portion spar constitutes the outboard portion with the blade attached (either by adhesive bonding or mechanically). In such a composite, the spar is then attached to the flexbeam, either permanently or removably, again either by adhesive bonding or mechanical engagement. In order to reduce weight and also provide for proper chordwise center of gravity and elastic axis locations, the outboard portion of the flexbeam-spar may be tapered as shown. The flexbeams (and spar) are preferably composed of a plurality of thin sheet-like layers of high modulus filaments in side-by-side relationship parallel to the longitudinal axis of the flexbeam and bonded together as stated with suitable matrix material such as the epoxy resin mixture of R-1942. In general, flexbeam and spar depth are less than 50% of blade thickness and the filaments are made of a material having a modulus of elasticity of at least about $20 \times 10^6$ psi. By way of example, suitable high modulus materials available in filament form include glass fiber, tungsten wire core boron filaments (with or without a protective coating of, for example, silicon carbide), graphite filaments and silicon carbide filaments. It is to be noted that while the flexbeam and spar filaments are aligned in a uniaxial orientation, it is recognized that slight variation therefrom may be made, as for example, an orientation of $\pm 5°$, to increase fatigue resistance.

Figure 2:
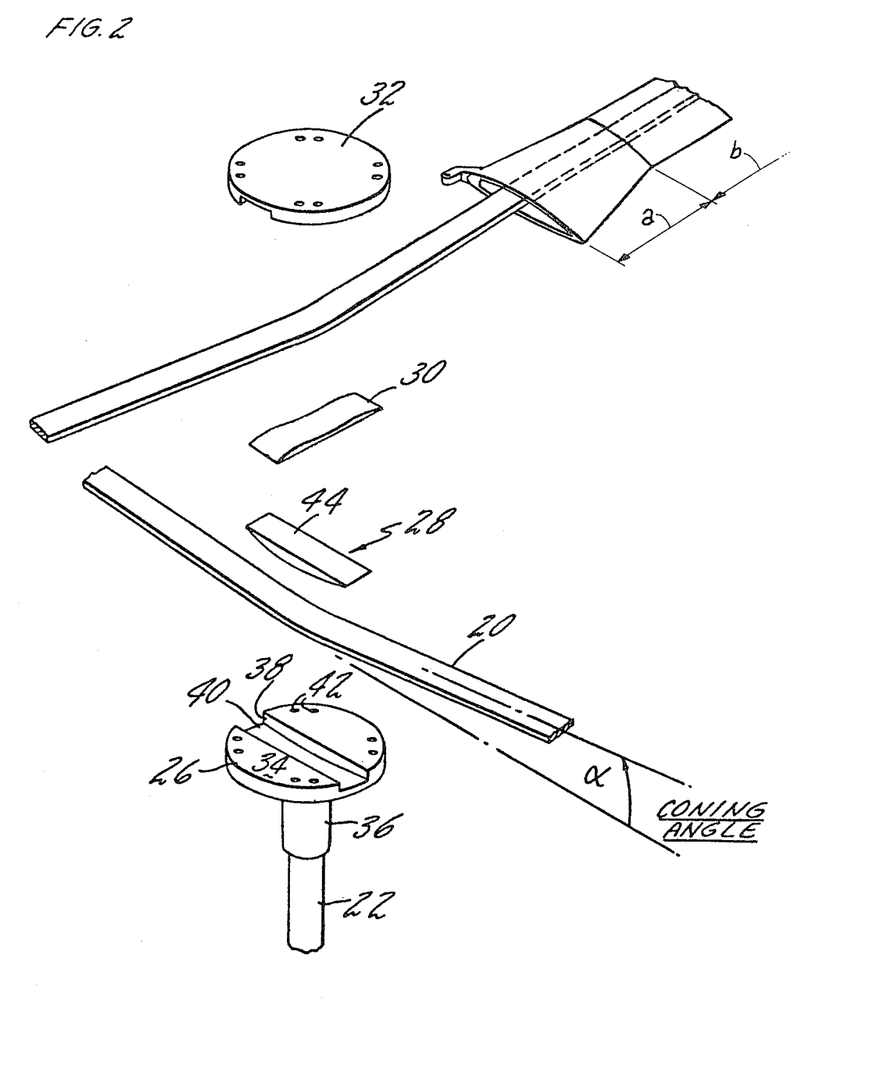
FIG. 2 is an exploded view, in perspective, of a rotary wing system having a unitary composite spar extending across the rotor mast and through both blade airfoil shells in accordance with the present invention.

The flexbeam 20 extends across the rotor mast 22 and is attached thereto at its midpoint by means of a hub assembly 24. As shown in FIG. 2, the assembly includes a lower hub plate 26, first and second filler pieces 28 and 30 and an upper hub plate 32. The lower hub plate 26 has a flat and horizontal upper surface 34 and a lower sleeve portion 36 received by the mast 22 for transmission of rotational forces. Both the lower plate 26 and the upper plate 32 have a diametrically extending slot 38 which is contoured to closely conform to the flexbeam 20 and provide built-in coning if desired. As depicted in the drawing, the slots have their outer edges 40 rounded to avoid stress concentrations in the flexbeam 20 and are provided with a coning angle $\alpha$. The hub plates 26 and 32 are provided with matching bolt holes 42 so that they may be secured together.

The filler pieces 28 and 30 are contoured respectively to clamp their associated flexbeam to the appropriate hub plate and, while so doing, present an outer face 44 which is flush with the flat facing surfaces of the hub plates. In other words, the first filler piece 28 has an inner face which conforms to the top surface portion of the flexbeam mid-portion while having a flat outer surface, essentially coplanar with surface 34. The same relationship exists between the second filler piece 30 and the upper hub plate 32. It will thus be appreciated that multiblade rotors may be assembled simply by stacking blade pairs one on the other and, since flexbeam depth is quite small, may be accomplished without excessive increase in hub thickness. It is important to note that the present configuration provides ready adaptability from an operative mode, wherein the hub plates have their slots disposed perpendicular to each other, to a storage mode, wherein the slots are aligned. In practice, the flexbeams are bonded, or otherwise secured, to their hub plate and filler piece in order to provide restraint against unbalanced blade centrifugal forces.

Figure 3:
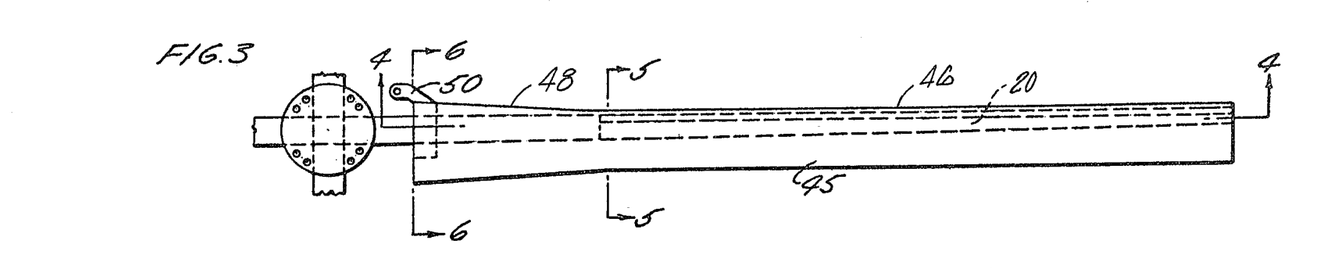
FIG. 3 is a plan view of a helicopter rotor hub and one blade assembly.
Figure 4:
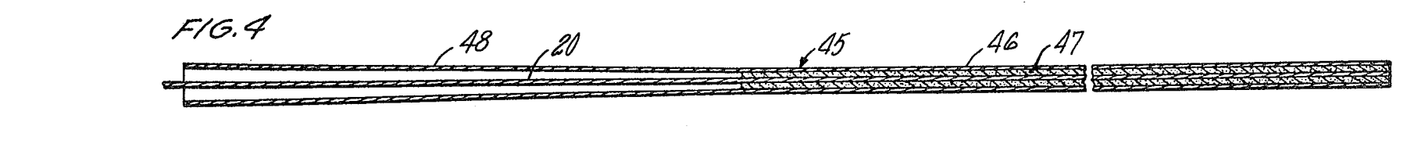
FIG. 4 is a sectional view taken along the line 4—4 in FIG. 3.
Figure 5:
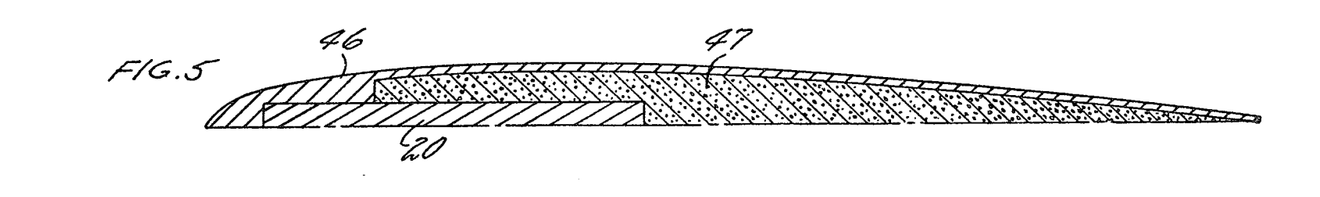
FIG. 5 is a sectional view, in section, taken along the line 5—5 in FIG. 3.
Figure 6:
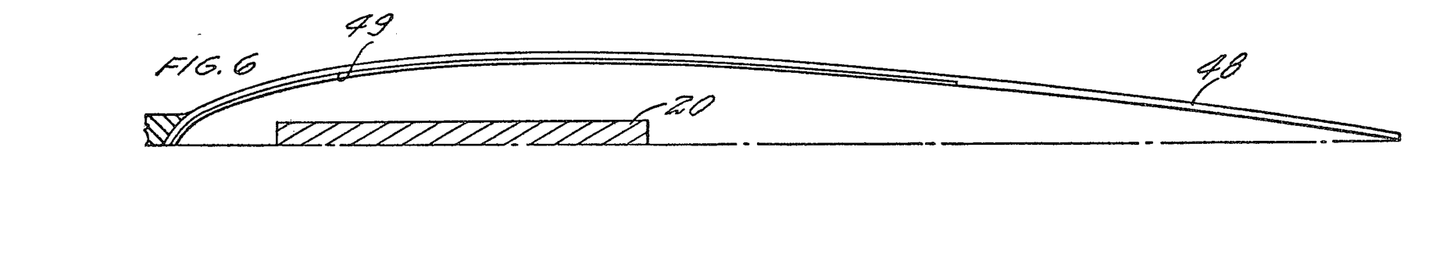
FIG. 6 is a sectional view, in section, taken along the line 6—6 in FIG. 3.

As indicated generally in FIGS. 3 and 4, each blade includes a filament reinforced composite airfoil shell 45 having an outboard portion 46 which is continuously bonded to an outboard portion of the flexbeam or spar portion of the flexbeam-spar composite 20 via lightweight filler material 47 (not shown in FIG. 3) such as conventional honeycomb or foam. The shell is preferably comprised of the same component materials as the spar 20. The inboard portion 48 of the shell is flared outwardly from the flexbeam and toward the hub beginning at a point designating approximately 10% to 15% of the flexbeam-spar (or rotor) radius. This represents an improvement over past designs (e.g., the Canadian Pat. No. 951,301) which are operable preferably at a 30% designation point. Because of the softness and improved torsion properties of the flexbeam, its length can be shortened and the stability and maneuverability of the blade system still be maintained. No filler material is provided in the portion 48 and the shell portion is not attached to the spar in any way other than the optional snubber shown in FIGS. 7a and 7b. Thus, the shell portion 48 and the spar can move independently of each other in bending as well as in twisting. This independent motion not only simplifies the mechanical construction of the hingeless and bearingless rotor but also facilitates coupling of the blade pitch and bending motions. Such coupling stabilizes blade out-of-plane motions on tail rotors and high speed main rotor systems although the rotor system of the present invention can be used in wind turbine systems as well. In addition, the relative motion of the flexbeam and shell may prove useful as a source of signals for aircraft stabilization systems. A metal insert 49 shown in FIG. 6 is bonded to the interior of the shell portion 48 at its root end to facilitate attachment of a pitch control horn 50 shown in FIG. 3 to the shell. In FIGS. 5 and 6, 20 indicates the flexbeam-spar of the present invention and 46 and 47 in FIG. 5 are as defined in FIG. 4. As will be appreciated by those skilled in the art, a swash plate-push rod arrangement (not shown) is utilized to effect pitch control.

For the rotor system to operate properly, it must be emphasized that the filaments of the composites forming the flexbeam 20 and the shell 44 must be properly oriented to obtain the proper ratios of bending to torsional stiffness. Further, the filament must be chosen and oriented so that: (1) the flexbeam is low in torsional modulus over the flexbeam region and amenable to significant twist angles being imparted thereto without excessive control system forces or spar stress while maintaining that flatwise and edgewise stiffness necessary for good handling and dynamic stability; (2) the shell is torsionally rigid with the elastic axis properly located. However, the outboard portion can still be maintained with conventional stiffness. As discussed heretofore, the flexbeam is an essentially uniaxial composite with all of its filaments oriented in a spanwise direction. The flexbeam should have a bending to shear modulus ratio of at least 10 to 1. The filaments in the airfoil shell are oriented to provide high torsional stiffness.

Wind tunnel tests of a composite rotor demonstrated the potential of the present invention. In this investigation, a dynamically scaled model rotor including a glass filament/flexible resin matrix was tested. Tests were conducted on a simulated fuselage where body motions could be experienced. The rotor with the high damping glass/resin flexbeam was tested for stability and compared to tests using the same model with the same blade natural frequencies but with conventional low damping glass/epoxy. The low damping blade experienced instabilities between rotor speeds of 27 cps and 31 cps, FIG. 13, whereas the high damping design (present invention) was stable at all speeds tested. The high damping blade of the present invention also operated at considerably lower stresses, levels well below the allowable fatigue limits of the material. Attention is directed to FIG. 13 which compares the system stability of a helicopter wind tunnel model using a high damping rotor according to the present invention (curve A) with that of a conventional or low damping rotor (curve B). As can be seen from the tests, the blade system according to the present invention never really went unstable.

It is to be noted that blade pitch control or feathering is achieved by elastically twisting a relatively long inboard portion of the flexbeam (approximately 10 to 15 percent of the radius) in order to minimize the flexbeam torsional stresses. The moment applied to the blade from the push rod is transmitted through the aerodynamic shell, which is effectively rigid in torsion, to the inboard flexbeam which is flexible in torsion. Inboard of the 10 to 15% blade station, the shell is free to move relative to the flexbeam in both torsion and bending as the blade pitch is changed.

Figure 7A:
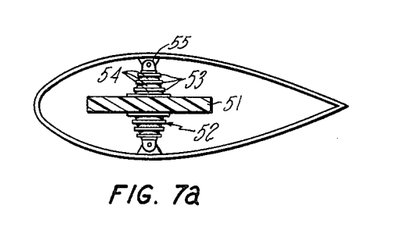
FIGS. 7a and 7b demonstrate a snubber modification of the present invention.
Figure 7B:
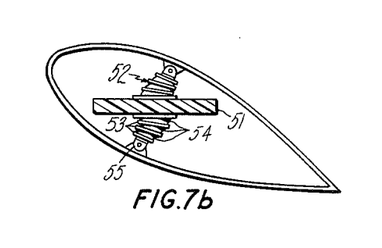

In FIGS. 7a and 7b the optional snubber assembly is demonstrated where 51 is the flexbeam, 52 a flexible laminate such as stainless steel 53/elastomer (e.g. silicone) 54 and attachment 55 which can be mechanically attached to the blade or preferably adhesively attached. The snubber assembly provides added stability to the system of the present invention while still allowing necessary blade movement for maneuverability. As demonstrated by the figures, the laminate 52 deforms to allow blade movement (7b) returning to its original position (7a) upon release of the deforming forces. The snubber assembly is positioned adjacent to the hub on the flexbeam and is preferably centrally (chordwise) located on the flexbeam.

FIG. 9 demonstrates driving frequency as a result of rotor speed in blades made according to the present invention. In this figure, $\Omega$ indicates the rotor frequency and $\omega_{ip}$ the in-plane blade frequency. The line $\Omega-\omega_{ip}$ represents the difference between the two and that portion of this line between the resonance points a and b indicates the stable helicopter body frequencies within which a helicopter is safely operated. The normal operating speed indicated as point c on this line must fall between these two points, and is ideally equidistant between the two points to protect against serious stability problems. Existing matched stiffness designs have not proven successful in this area.

Figure 10A:
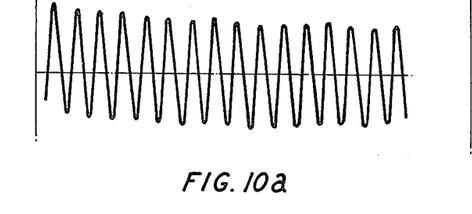
FIGS. 10a and 10b demonstrate bending response after initial deflection of various samples according to the present invention.
Figure 10B:
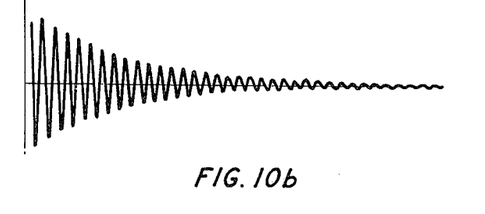

Bending responses of sample composite specimens are demonstrated in FIG. 10. The measured damping relative to the critical damping for conventional carbon epoxy and the high damping carbon/epoxy of the present invention were 0.3% (FIG. 10a) and 5.0% (FIG. 10b), respectively. Blade damping levels greater than 3% would be sufficient in the matched stiffness design to preclude air and ground resonant instabilities (FIG. 9). The system of the present invention can surpass this in significant degree.

Figure 12:
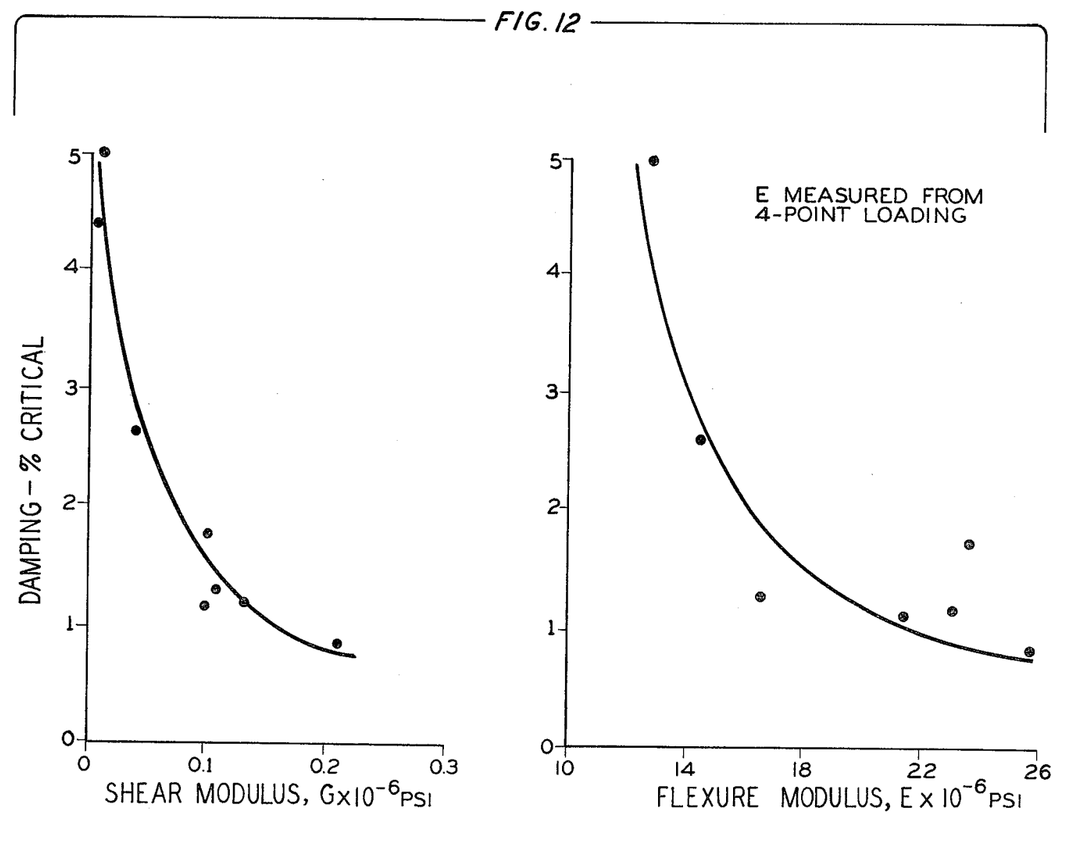
FIG. 12 demonstrates effect of damping on shear and flexure modulus.

FIG. 12 demonstrates the effect of damping on shear modulus and flexure modulus and further illustrates the advantage of the higher percents critical damping the flexbeams impart to the blade systems of the present invention.

Figure 11A:
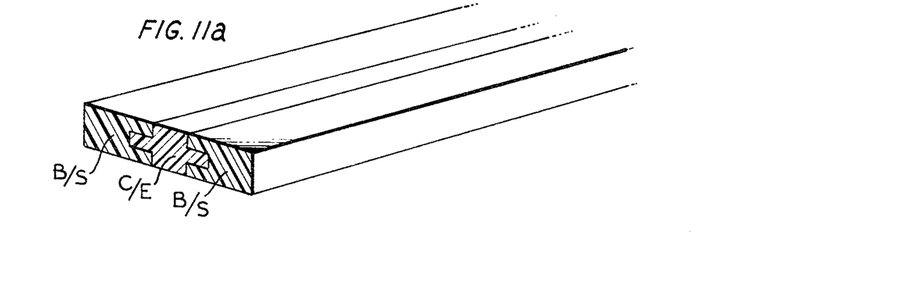
FIGS. 11a, 11b and 11c demonstrate schematically particular flexbeams and blade arrangements according to the present invention.
Figure 11B:
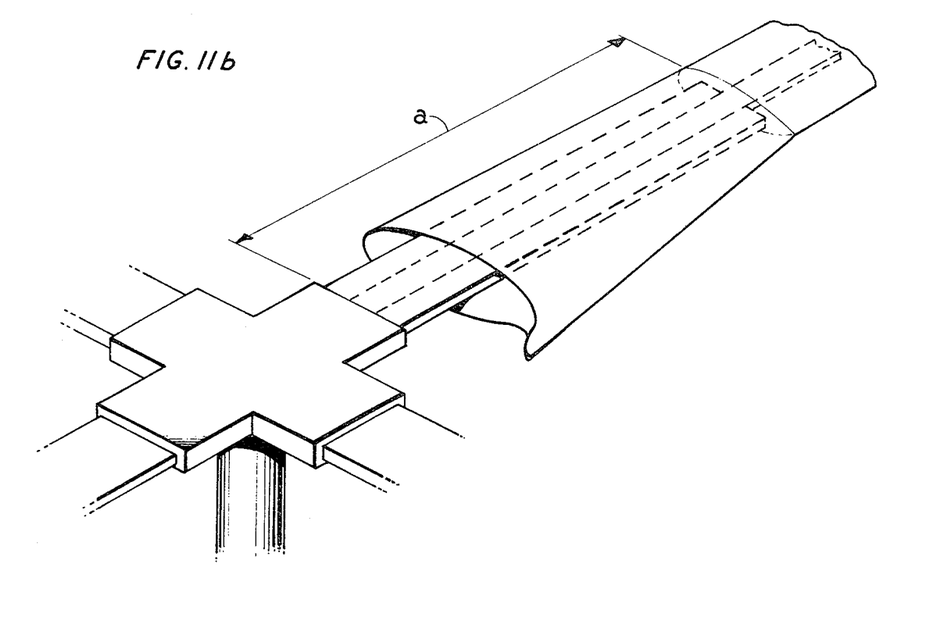
Figure 11C:
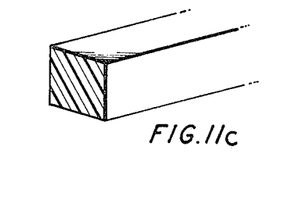
Figure 15:
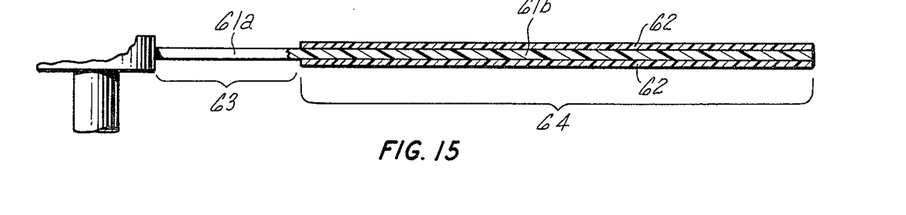
FIG. 15 demonstrates a flexbeam-spar with differential fiber orientation.

FIG. 11 demonstrates a particular matched stiffness design useful in accordance with the present invention. As noted from FIG. 11a, the chordwise dimension of the carbon epoxy (C/E) flexbeam is reduced and replaced with a boron-silicone composite (B/S) over the flexure portion (a in FIG. 11b) of the blade. Since this is the major portion of the blade which undergoes elastic deformation, the high damping material is required only over this region. The specific shape and quantities of the two composite materials are selected so that the centrifugal and flapping loads are taken up by the core and the edgewise load taken up by both the core and the outer composite material as shown in FIG. 11a where C/E indicates conventional carbon fiber epoxy flexbeam and spar material (see Canadian Pat. No. 951,301) and B/S a boron filament-silicon resin. This is also seen in FIG. 11b where the boron-silicone portion of the composite extends only inboard (a) while the carbon/epoxy core continues the full length inboard and outboard to allow free shear deformation while the blade bends in-plane. Another embodiment is one in which the high damping resin is integral with the fiber reinforcement and evenly distributed throughout the cross section. In this embodiment, the cross section would be essentially symmetrical, e.g., square or circular. If a continuous flexbeam-spar is used (note FIG. 15), it is preferred that a unidirectional layup of reinforcing fiber 61a and 61b is used to make up the flexbeam portion 63 of the flexbeam-spar and $\pm 45°$ fiber orientation 62 is used or bonded to the spar portion 64 of the flexbeam-spar. It should be noted that the unidirectional layup in the flexbeam 61a can be extended to the spar portion 61b or terminated at the end of the flexbeam portion 63 and the entire spar portion 64 be comprised of $\pm 45°$ fiber layup laminate. A square or rectangular cross section shape is preferred, especially for ease of fabrication reasons (FIGS. 11a and 11c). The edgewise deflections will produce shear deformation in the outer material thereby creating the required damping. The control inputs to the rotor would be accomplished in a manner similar to the high in-plane stiffness system and would not require any increase in torsional moment, since the combined shear stiffness of the composite structure would not be greater than the conventional design of a noncomposite material.

Although this invention has been shown and described with respect to a preferred embodiment, it will be understood by those skilled in this art that various changes in form and detail thereof may be made without departing from the spirit and scope of the claimed invention.

Having thus described a typical embodiment of my invention, that which I claim as new and desire to secure by Letters Patent of the United States is:

1. A rotary blade system comprising a composite flexbeam with in-plane and out-of-plane stiffnesses approximately equal extending between and connected to at least two rotor blades, the flexbeam having an essentially symmetrical cross-section and extending at least the entire length of the inboard portion of the blades and the blades securely affixed to the flexbeam at the outboard portion of the blades, the blade system having a primary in-plane frequency less than the primary rotor frequency.

2. The apparatus of claim 1 wherein the inboard portion of the blades constitutes approximately 10% to 15% of the blade length.

3. A rotor wing system comprising a mast rotatable on its longitudinal axis, at least two rotor blades arranged on opposite sides of said axis, a composite flexbeam with in-plane and out-of-plane stiffnesses approximately equal extending between and attached to at least two rotor blades, the flexbeam having an essentially symmetrical cross-section and extending at least the entire length of the inboard portion of the blades and the blades securely affixed to the flexbeam at the outboard portion of the flexbeam, the blade system having a primary in-plane frequency less than the primary rotor frequency, means for mounting the flexbeam at its midpoint on the mast for rotation therewith, said blades including an airfoil shell having an outboard portion attached to the flexbeam, the inboard portion of the shell being twistable relative to the flexbeam.

4. The apparatus of claim 3 wherein the mounting means comprises a pair of plate members mounted on the mast and secured to each other, at least one of said plate members having a diametrically extending slot in its mating surface, the flexbeam being disposed between the plate members in the slot.

5. The apparatus of claims 1 or 3 including a plurality of snubbers securely affixed between the upper and lower portions of the flexbeam and the blade shell.

6. The apparatus of claim 3 having a spar portion which is removably attached to the flexbeam and wherein the blade has a shell portion which is securely attached to the spar.

7. The apparatus of claims 1 or 3 wherein the composite flexbeam comprises a resin matrix comprising about 20% to about 43% by weight flexible epoxy, about 12% to about 35% by weight stiff epoxy, about 35% to about 61% by weight flexible curing agent, and about 20% to about 50% by weight of a high modulus fiber based on the weight of fiber plus resin.

8. The apparatus of claim 7 wherein the stiff epoxy is present in an amount about 24% by weight, the flexible epoxy is present in an amount about 27% by weight, and the flexible curing agent is present in an amount about 49% by weight.

9. The apparatus of claim 8 wherein the fiber is present in an amount about 42% by weight.

10. The apparatus of claim 7 wherein the flexible epoxy is a linoleic dimer acid glycidal ester epoxy, the stiff epoxy is an epichlorohydrin-bisphenol-A-diglycidal ether epoxy, the flexible cross-linking agent is a long chain amine-fatty acid amide, and the high modulus fiber is graphite.

11. The apparatus of claim 7 having a flexural strength greater than $5 \times 10^3$ psi, flexural modulus greater than $10 \times 10^6$ psi, damping up to about 6% critical, torsional shear modulus less than about $3 \times 10^5$, and stress at elastic limit greater than 60 psi.

12. The apparatus of claim 7 having a flexural strength about $15.6 \times 10^3$ psi, flexural modulus about $14.3 \times 10^6$ psi, damping about 2.64% critical, torsional shear modulus less than about $3.88 \times 10^4$, and stress at elastic limit about 95 psi.

* * * * *